Figure 1:
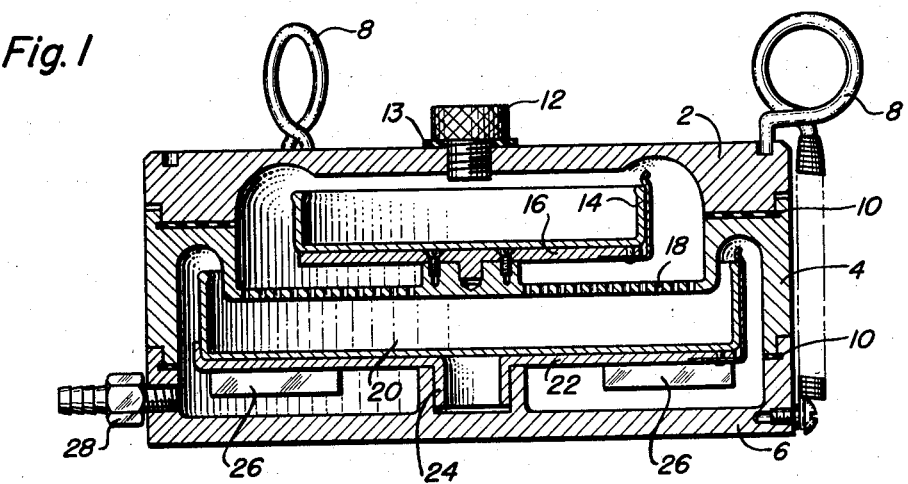

July 14, 1959     F. W. SINDEN     2,894,877
WIDE RANGE AEROSOL SAMPLER

Filed Aug. 29, 1958

INVENTOR
Frank W. Sinden

BY *George Renehan*
ATTORNEY

United States Patent Office 2,894,877
Patented July 14, 1959

2,894,877

WIDE RANGE AEROSOL SAMPLER

Frank W. Sinden, Stirling, N.J.

Application August 29, 1958, Serial No. 758,162

7 Claims. (Cl. 195—103.5)

(Granted under Title 35, U.S. Code (1952), sec. 266)

The invention described herein may be manufactured and used by or for the Government of the United States of America for governmental purposes without payment to me of any royalty thereon.

This invention relates to an aerosol sampling device. More particularly it relates to a device for collecting and culturing organisms disseminated in aerosol clouds. It is designed to make an accurate assessment of clouds over a wide range of aerosol densities; to discriminate between particles of different sizes and to permit a quick count and evaluation of the sample after it has been cultured.

In general, aerosol material may be collected either in a liquid or directly on a nutrient surface. If it is collected in a liquid, it is assayed by spreading a measured amount of the liquid on a nutrient surface in the laboratory and counting the colonies which result. If the concentration is high the liquid may be diluted. Direct collection is generally superior because it avoids the intermediate dilution step and the inevitable errors associated with it. Unfortunately, direct surface collection severely limits the range of measurable aerosol density. For example, a surface area corresponding to that of a large Petri dish is capable of accommodating about 500 randomly distributed colonies. This is only about five times the minimum number of 100 colonies which is necessary to give a statistically reliable measure. Since the ratio between the maximum and minimum number of particles, that have to be sampled, may be many thousands to one and is often measured on a logarithmic scale, it is obvious that some system other than direct surface sampling must be used.

The main purpose of the present device is radically to widen the range of the total number of particles or dose measurable with a surface collecting instrument. The basic idea is to distribute the particles nonuniformly over the collecting surface and to count only those colonies that are well separated. If the dose is high only a small part of the surface will be uncongested enough to permit counting, while if the dose is low a larger part of the surface will be countable.

Air is drawn through the sampler at a controlled rate. It passes first through a pre-impactor stage which removes all particles larger than a specifiable "cut-off" size. This cut-off size depends critically on the dimensions of the pre-impactor nozzle. By supplying a set of easily interchangeable nozzles, means is provided for setting the cut-off size at will. The air then passes through a circular pattern of openings on to a rotating nutrient medium. After exposure the nutrient medium is incubated and the resulting pattern of colonies inspected. The total number of particles deposited on the plate can be estimated by counting a certain portion of the colonies.

Figure 2:
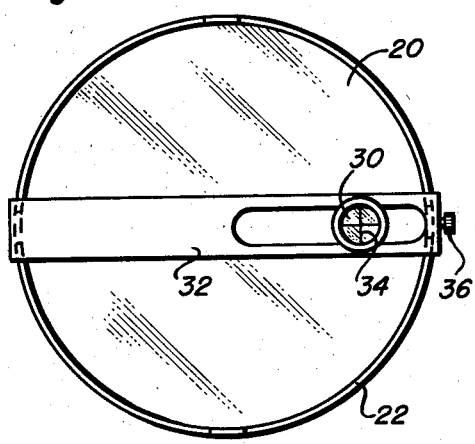
Figure 3:
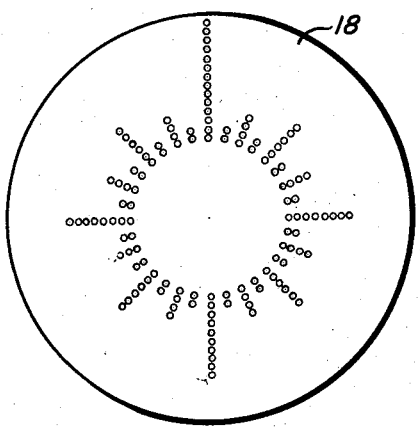
Figure 4:
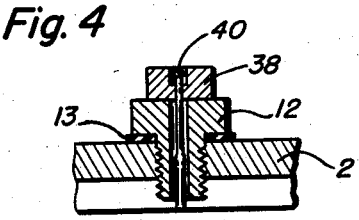
Figure 5:
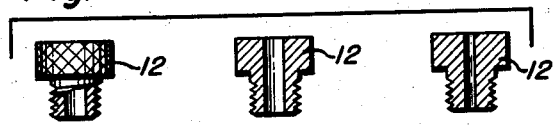

In the drawings, Fig. 1 shows a vertical section through the sampler. Fig. 2 is a top view of the counting apparatus positioned over the bottom section of the sampler of Fig. 1. Fig. 3 is a view of the circular grid of openings. Fig. 4 is a gauge used to set the pre-impactor to the correct distance above the medium in dish 14. Fig. 5 shows sections through three different sizes of pre-impactor nozzles.

More particularly, 2, 4 and 6 show respectively the cover section, central grid section and bottom body section of the sampler. These sections are held together in compression by spring clamps 8 which seal the sections about packings 10, 10.

Cover 2 is fitted with a pre-impactor nozzle 12 positioned over rubber washer 13. Dish 14 is placed on pedestal 16, so raised and positioned that the deflected aerosol stream has free access to the grid openings 18 of the center section. These openings are of such small size as to produce a velocity that will insure the deposition of the smallest aerosol particles on the lower medium. This latter medium is placed in dish 20, which is held in position on turntable 22. This turntable is supported in bearing 24 and has attached magnets 26, 26 which permit the rotation of the plate by magnetic attraction through the non-magnetic bottom casing 6. Various types of motors with correspondingly mounted magnets may be used for this drive. A direct drive through an air-tight bearing may also be used. Exit nozzle 28 completes the structure.

The openings 18 in the center grid section are positioned as shown in Fig. 3 and this grid pattern is largely responsible for the characteristic functioning of the device. There are 14 radial positions, at progressively greater distances from the center, in this grid. Each of these radial positions have a number of openings spaced uniformly about its circumference. The number of openings on each circle, starting from the outside, is given in the following table:

*Table of openings*

|  | Circle | No. of openings |
|---|---|---|
| outside | 1 | 1 |
|  | 2 | 1 |
|  | 3 | 1 |
|  | 4 | 1 |
|  | 5 | 2 |
|  | 6 | 2 |
|  | 7 | 4 |
|  | 8 | 4 |
|  | 9 | 8 |
|  | 10 | 8 |
|  | 11 | 16 |
|  | 12 | 16 |
|  | 13 | 32 |
| inside | 14 | 32 |

In operating the sampler, the proper pre-impactor nozzle 12 is inserted to give the desired particle size cut-off. The distance from the nozzle to the medium in dish 14 critically affects the cut-off size, and is adjusted by means of the gauge shown in Fig. 4. The gauge, consisting of a block and plunger, is placed on the nozzle with the plunger resting on the surface of the nutrient gel in plate 14. The nozzle is then screwed down over the flexible rubber washer until the top of the plunger is flush with the gauge block. A drive is applied to turntable 22 and a vacuum is applied at outlet 28. As the air is aspirated through the sampler, the larger particles impinge on and are captured by the medium in dish 14. The balance of the aerosol is deflected and passes around the dish and enters grid openings 18. The latter are sufficiently small so that the remaining aerosol particles down to about 1 micron are all deposited on the nutrient medium in dish 20. Since openings 18 are all of one size, the expected number of particles passing through each of them is the same. Due to the rotation of agar plate 20, the particles are deposited in concentric circles. When this deposit is cultured, the bacterial colonies become visible as dots randomly distributed about each of the circles. Since the number of particles deposited in any circle is proportional to the number of openings on that circle, the inner circles will be far more congested than the outer circles. The effect is further accentuated by the lesser circumference of the inner circles. Starting with the outside circle, all the colonies are counted on each circle until a circle is encountered on which the colonies are too congested to be easily distinguishable. From this count the total number of particles which fell on the plate can be estimated. With a plate 5 inches in diameter, and colonies about 1 millimeter in diameter, the outer circles are still uncongested enough to count when the total number of particles is as high as 10,000. By counting the colonies under a magnifying glass at an earlier stage of growth the capacity of the device can be further increased.

Counting is facilitated by the use of the device shown in Fig. 2. Mounted glass 30 with crosshairs 34 can be radially adjusted in rack 32. This entire assembly is placed over the turntable on the lower unit 6. The agar plate with the incubated colonies on it is turned slowly under the glass. As each colony passes the crosshair a hand counter is punched. Screw 36 runs against a stop on the turntable when the latter has made one complete revolution.

As shown in Fig. 3, the holes 18 are arranged in seven pairs of concentric rings. The total number of holes on the first $k$ pairs of rings, counting from the outside, is just equal to the number on the $(k+1)$ pair. Thus, there are 16 holes on the fifth pair of rings and a total of 16 holes on all rings outside of that. Since the density of deposited particles follows a similar pattern, the number of colonies counted is, on the average, equal to the number on the first ring pair that is too congested to count. The capacity of a ring, that is, the number of colonies it can accommodate without overcrowding, is proportional to its circumference. The outer rings accordingly have a larger capacity than the inner ones. If, then, the number of particles sample, or dose, is relatively light, the first overcrowded ring will be close to the inside and then umber of colonies on it and hence the number counted will be somewhat smaller than in the case of a heavy dose. Compared to the wide variation in dose measurable with the device, however, the number of colonies counted is quite constant. The dimensions of the prototype were selected so that this number would always be between 100 and 300 colonies. The effort required to assay a sample is largely independent of the size of the dose. When the count is completed, the dose in particles per unit flow rate is obtained by dividing the number of colonies counted by $nf$, where $n$ is the number of jet holes impinging on the part of the plate counted, and $f$ is the flow rate through a single hole.

It is important to have a standard for determining when a ring should be deemed overcrowded. In order to minimize errors due to statistical variation, as many rings as possible should be counted. On the other hand, counts of badly congested rings are subject to errors due to the coalescence of neighboring colonies. Both errors are statistical in nature. By means of statistical theory a best compromise was found. For the prototype sampler this result was embodied in a simple rule for determining the point at which to stop counting.

The matter of particle size distribution is of great importance in sampling aerosols, since animal infectivity is closely associated with particle size. In the present instrument, information about particle size distribution may be obtained by using a multiplicity of samplers, each set for a different cutoff size and arranged in parallel. The pre-impaction nozzles are designed to have a very sharp particle size cutoff. Theory predicts that if the distance from the nozzle to the plate is approximately ⅓ of the diameter of the bore, that the cutoff wil lbe very sharp. The preimpactor nozzles were designed to exploit this result. The length of the interchangeable nozzles varies with the size of the bore in such a way that the same gauge serves to adjust them all.

I claim:

1. An aerosol sampler comprising a casing, having top and bottom openings, a perforated plate positioned transversely of said casing, said plate having small radial openings positioned at spaced distances from the center of said plate, a nutrient covered plate positioned beneath said perforated plate and adapted to be rotated with respect to said perforated plate and means for exhausting an aerosol into the top opening of said sampler through said perforated plate and onto said nutrient medium and out through the bottom opening of said casing.

2. A sampler in accordance with claim 1 wherein the perforations in said plate are positioned on a series of concentric circles, the inner circle having the largest number of perforations and the outer circle having the least number of perforations.

3. A sampler in accordance with claim 2 wherein the outer four circles have one opening each and each succeeding two circles have twice the number of openings in each instance.

4. A sampler in accordance with claim 3 wherein there are fourteen circles with one opening in each of the outer four circles and thirty-two openings in the inner two circles.

5. A sampler in accordance with claim 1 wherein the casing is composed of three sections, the upper section being in the form of a cover having a central opening, the central section including the transverse perforated plate and the lower section supporting the rotating nutrient covered plate.

6. A sampler in accordance with claim 5 wherein the central opening of the upper section is fitted with a sizing jet and wherein a stationary nutrient covered plate is positioned below said jet to receive the larger aerosol particles by impingement.

7. A sampler in accordance with claim 5 wherein the rotating nutrient covered plate is positioned on a rotating stand journalled in the bottom of said casing and fitted with magnets whereby the device may be rotated by suitable magnetic means through the bottom casing.

References Cited in the file of this patent

UNITED STATES PATENTS

| | | |
|---|---|---|
| 2,771,398 | Snyder | Nov. 20, 1956 |
| 2,865,816 | Stefanye et al. | Dec. 23, 1958 |